Figure 1:
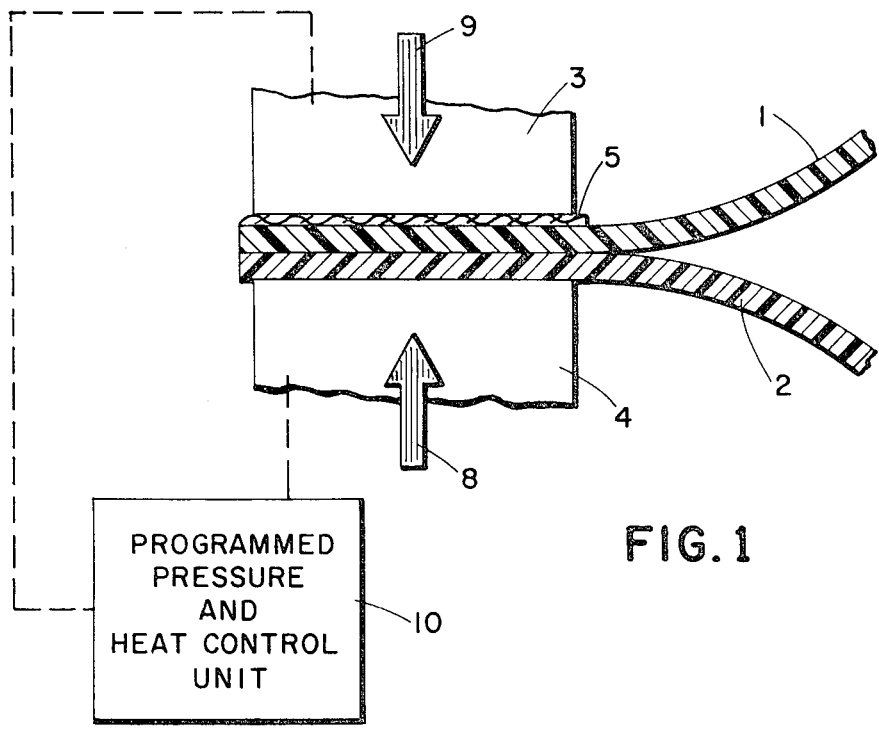

United States Patent

[11] 3,616,004

| [72] | Inventor | Sigbert Samson<br>Rozendaal, Gelderland, Netherlands |
|---|---|---|
| [21] | Appl. No. | 812,601 |
| [22] | Filed | Apr. 2, 1969 |
| [45] | Patented | Oct. 26, 1971 |
| [73] | Assignee | American Enka Corporation<br>Enka, N.C. |
| [32] | Priority | Apr. 2, 1968 |
| [33] | | Netherlands |
| [31] | | 6,804,634 |

[54] METHOD FOR SEALING MULTILAYER THERMOPLASTIC FILMS
12 Claims, 2 Drawing Figs.

[52] U.S. Cl. .................................................... 156/182,
156/306, 156/309
[51] Int. Cl. ....................................................... B32b 31/00
[50] Field of Search ............................................. 156/73,
182, 272, 273, 306, 309

[56] References Cited
UNITED STATES PATENTS

| 2,726,707 | 12/1955 | Wellons et al. ............... | 156/306 |
| 2,774,702 | 12/1956 | Smith .......................... | 156/306 X |

*Primary Examiner*—Carl D. Quarforth
*Assistant Examiner*—R. L. Tate
*Attorney*—Francis W. Young ABSTRACT: A method for sealing at least two multilayer polymeric films each being built up of two or more alternating layers of different thermoplastic component polymers, e.g., polyethylene and polyamide, which includes the steps of applying pressure to at least two of the multilayer films arranged to be sealed together in a sealing area, simultaneously heating the films in the area to a first temperature which is at least equal to the softening point of the polyethylene component, but lower than the softening point of the polyamide component, e.g., about 140° C., and then heating the films in the sealing area to a second temperature which is at least equal to the softening point of the polyamide component, e.g., about 220° C., whereby the layers of the polyamide are fused together to provide a seal between the films. An apparatus for carrying out this method is also disclosed.

INVENTOR
SIGBERT SAMSON

BY Francis W. Young
ATTORNEY

METHOD FOR SEALING MULTILAYER THERMOPLASTIC FILMS

This invention relates to the preparation of seals between multilayer polymeric films by the application of heat and pressure and more particularly to a method for sealing such films in which at least two multilayer films, each built up of two or more alternating layers of different thermoplastic component polymers having different softening points, are sealed together, to an apparatus for carrying out this method, and to the sealed film products produced thereby.

Heretofore, it has been found that the sealing of two polymeric multilayer films by the methods usually employed for monolayer films generally leads to seals of insufficient strength and uniformity.

Advantageously, the present invention provides a method of sealing multilayer polymeric films which does not have these drawbacks.

Thus, this invention contemplates a method for sealing multilayer polymeric films in which at the sealing area, the multilayer films, which are kept under an initial pressure, are first heated to a temperature that is at least equal to the softening point of the lowest melting polymeric component, but lower than the softening point of the highest melting polymeric component of the films, and the films are only then heated to a temperature which is at least equal to the softening point of the highest melting polymeric component.

It has surprisingly been found that in this way, two or more layers of the highest melting polymeric component are fused together to provide a particularly uniform and high strength seal. According to the invention, when the pressure during the first heating step is kept sufficiently high, i.e., higher than 100 kg./cm.$^2$, but preferably between 300 and 1,800 kg./cm.$^2$, then a seal is obtained that has a strength equal to or greater than that obtained with comparable monolayer films.

According to the invention especially favorable results are obtained when during the second heating step at a higher temperature the pressure applied to the sealing area is kept considerably lower than that applied during the first heating step. It is preferred that during the second heating step the pressure applied to the sealing area should be about 2 to 8 kg./cm.$^2$.

The method of the invention may be carried out in a simple and effective manner when there is a gradual transition from the first heating step to the second heating step, and when these heating steps are carried out in a continuous manner.

The method of this invention advantageously may be further characterized in that in each film, the layers which consist of the highest melting polymeric component together have a total thickness of at least 0.005 mm. More particularly, the method is used for the sealing of multilayer films having successive layers that are virtually immiscible with each other. Particularly good results have been obtained with the sealing of films when the successive layers of the films alternately consist substantially of polyethylene and polyamide, when the total thickness of each of the films is not more than about 0.100 mm., and the number of layers of each of the films is eight. It will be appreciated and it is also possible to use a far greater number of layers, for instance 32. In a preferred embodiment of the invention one of the films is covered at the sealing area with a metal gauze or the surfaces of the sealing jaws that come into contact with the films are profiled.

This invention also is concerned with a layered product made from multilayer thermoplastic film materials and sealed by the heretofore described method.

In addition, this invention contemplates an apparatus for carrying out the method, which includes means for applying the required pressures to the films to be sealed and heating means providing a heat flow in accordance with a predetermined program wherein the films are successively first heated to the desired lower temperature and then to the desired higher temperature.

It will be appreciated that the multilayer films may be made of two or more substantially immiscible component polymers having different softening points such as polyamide, polyester, polyethylene, thermoplastic rubbers and the like, and that these films may be produced by methods and apparatus well known in the film-forming art. These apparatus may employ stationary guide members of the type disclosed in U.S. Pat. No. 3,051,453 for producing a multilayer polymeric stream that is subsequently formed into a multilayer film.

Figure 2:
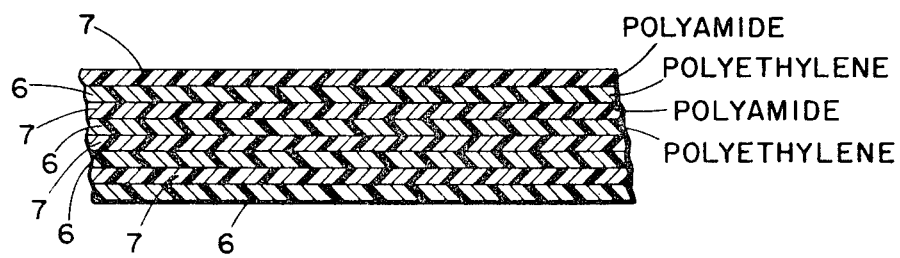

This invention will be further described with reference to the accompanying schematic drawings in which:

FIG. 1 shows a schematic representation of a apparatus that uses a pair of pressure-applying jaws having a metal gauge therebetween for sealing layered films in accordance with the invention; and FIG. 2 shows, on an enlarged scale, multilayer film of the type that can be sealed by the method and apparatus of this invention.

FIG. 1 shows two films 1 and 2, which are to be fused together with their edges located between pressure-applying jaws 3 and 4. These jaws are capable of heating the films to the different elevated temperatures required for sealing the films and are regulated in a programmed manner by the pressure and heat control unit 10. Provided between the upper jaw 3 and the film 1 is a gauze 5. In the embodiment illustrated each film is composed of 8 layers which alternately consist substantially of polyethylene or polyamide.

The polyethylene and polyamide layers are referred to in FIG. 2 by the reference numerals 6 and 7, respectively. A few weight percent of an agent that promotes the adhesion between the layers in each of the films is added to both of these component polymers. Such an agent may, for instance, consist of an alkene copolymer containing acid groups, such as a copolymer of ethylene and acrylic acid.

In the first heating step of the method of this invention, the jaws 3 and 4 are forced together as shown by the arrows 8 and 9, thus applying to the films to be sealed, a pressure of 625 kg./cm.$^2$ of the real contact surface between the jaws and the films, while at the same time the film material is heated by the jaws to a temperature of 140° C.

It will be understood that this temperature is higher than the softening point of the lowest melting component polymer (i.e., polyethylene), and lower than the softening point of the highest melting component polymer (i.e., polyamide).

Subsequently, in the second heating step of the method, the films are at the far lower pressure of about 2 to 8 kg./cm.$^2$, heated to a temperature of about 220° C. This temperature is higher than the softening point of the polyamide used. Next, the jaws are opened, and the seal between the films is complete.

By following this method of sealing multilayered films, it was found that after sealing the herefore-described films 1 and 2, the force required for severing the films was 2,280 g. per 30 mm. length perpendicular to the plane of the drawing of the seal in FIG. 1. This value is very acceptable and considered good.

In this sealing operation, the films 1 and 2 were in contact with each other along with their polyamide layers 7.

In contrast to these results, it was found that with two sealed monolayer films substantially consisting of polyamide and each having a thickness of 0.20 mm., the force required to sever the sealed films was only 1,284 g. per 30 mm. length perpendicular to the plane of the drawing of the seal, as shown in FIG. 1. Thus, this seal strength is distinctly less satisfactory than that of the multilayer films fused together in accordance with the present invention.

In the sealing of these monolayer polyamide films use was made of the contact pressure of from about 2 to 8 kg. per cm.$^2$ of the real contact surface and the film materials were heated to a temperature of about 220° C. in a single step operation.

Although the method according to the invention is effected by a first or primary heating step and a second or secondary heating step, there may be a gradual transition between the two heating steps. The steps may be accomplished in a continuous process in a very short time, for instance in less than 1 second.

In the above-described embodiment of the method of this invention for sealing layered films, the acceptable strength of 2,280 gf./30 mm. was reached. It will be appreciated, however, that even higher strengths, for instance 3,000 g/30 mm., may be reached by this method.

If no metal gauze such as designated by reference numeral 5 is used, the jaws 3 and 4 may be studded or otherwise profiled.

It will be appreciated that during the method of the invention the films may be heated by various known methods (and the appropriate heating means) such as high-frequency heating, contact heating, impulse heating or supersonic heating.

What is claimed is:

1. A method for sealing at least two multilayer polymeric films by the application of heat and pressure, said films each being built up of two or more alternating layers of different thermoplastic component polymers having different softening points, which comprises applying pressure to at least two of the multilayer films arranged to be sealed together in a sealing area, simultaneously heating the films in said area to a first temperature which is at least equal to the softening point of the lowest melting component but lower than the softening point of the highest melting component, and then heating the films in the sealing area to a second temperature which is at least equal to the softening point of the highest melting component, whereby said layers of the highest melting component are fused together to provide a seal between the films.

2. The method of claim 1 in which the pressure applied is higher than 100 kg./cm.² when the films are first heated.

3. The method of claim 2 in which the pressure applied is from about 300 to about 1,800 kg./cm.², and preferably from about 500 to about 1,000 kg./cm.² when the films are first heated.

4. The method of claim 1 in which the pressure applied to the films at the higher temperatures is not more than about 20 to 30 kg./cm.² and preferably from about 2 to 8 kg./cm.².

5. The method of claim 1 in which there is a gradual transition in the heating of the films from the first to he second temperature and the heating is carried out in a continuous manner.

6. The method of claim 1 in which in each film the layers which consist of the highest melting component together have a total thickness of at least 0.005 mm.

7. The method of claim 1 in which the component polymers of the successive layers are virtually immiscible.

8. The method of claim 1 in which the layers of each film alternately consist substantially of polyethylene and polyamide.

9. The method of claim 1 in which the total thickness of each of the films is not more than about 0.100 mm.

10. The method of claim 1 in which each of the films comprises eight alternate layers.

11. The method of claim 1 in which one of the outermost films is first covered with metal gauze at the sealing area.

12. The method of claim 1 in which pressure is applied to the films by a pair of the sealing jaws having contact surfaces that are profiled.

* * * * *